US012052297B2

(12) United States Patent
Zaifuddin et al.

(10) Patent No.: US 12,052,297 B2
(45) Date of Patent: Jul. 30, 2024

(54) SELF-HEALING AND RESILIENT IP MULTIMEDIA SUBSYSTEM CORE

(71) Applicant: T-Mobile USA, Inc., Bellevue, WA (US)

(72) Inventors: Sabuhi Kiran Zaifuddin, Redmond, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 163 days.

(21) Appl. No.: 16/919,820

(22) Filed: Jul. 2, 2020

(65) Prior Publication Data

US 2022/0006845 A1    Jan. 6, 2022

(51) Int. Cl.
*H04L 65/1083* (2022.01)
*H04L 65/1016* (2022.01)
*H04L 65/1046* (2022.01)
*H04L 65/1073* (2022.01)
*H04W 8/04* (2009.01)
*H04W 24/04* (2009.01)
*H04L 65/1104* (2022.01)
*H04L 65/80* (2022.01)

(52) U.S. Cl.
CPC ...... *H04L 65/1083* (2013.01); *H04L 65/1016* (2013.01); *H04L 65/1046* (2013.01); *H04L 65/1073* (2013.01); *H04W 8/04* (2013.01); *H04W 24/04* (2013.01); *H04L 65/1104* (2022.05); *H04L 65/80* (2013.01)

(58) Field of Classification Search
CPC ............... H04L 69/40; H04L 65/1016; H04L 65/1073; H04L 65/80; H04L 65/1046; H04L 65/1083; H04L 65/1104; H04W 8/00–16; H04W 24/04
See application file for complete search history.

(56) References Cited

U.S. PATENT DOCUMENTS

| 10,659,427 B1 * | 5/2020 | Ratcliffe ............. H04L 61/4552 |
| 2010/0039930 A1 * | 2/2010 | Liang ...................... H04L 69/40 |
| | | 370/216 |
| 2011/0128843 A1 * | 6/2011 | Przybysz ................ H04L 29/14 |
| | | 370/216 |

(Continued)

OTHER PUBLICATIONS

Renier, Thibault Julien, Dependable IMS services—A Performance Analysis of Server Replication and MidSession Inter-Domain Handover, Aalborg University, Denmark, pp. 1-186 (Year: 2008).*

*Primary Examiner* — Benjamin H Elliott, IV
*Assistant Examiner* — Prince A Mensah
(74) *Attorney, Agent, or Firm* — Lee & Hayes, P.C.

(57) ABSTRACT

A system and method for a resilient and self-recovery IP multimedia subsystem. In response to a subscriber who is registered with a first S-CSCF, a second S-CSCF is established as well and a flag is provided to a database. The database stores data for the session. The second S-CSCF is concurrent and separate from the first S-CSCF. In addition, the restoration data element in the first S-CSCF is deactivated. When the first S-CSCF is timed-out or fail to respond, instead of sending a restoration data, the second S-CSCF activates the flag with the database so that the second S-CSCF may establish with the database to continue with the session for the subscriber. The database identifies the session and restores the session data for the second S-CSCF.

18 Claims, 8 Drawing Sheets

(56) References Cited

U.S. PATENT DOCUMENTS

| | | | |
|---|---|---|---|
| 2012/0131202 A1* | 5/2012 | Qiu | H04L 69/40 709/227 |
| 2014/0192773 A1* | 7/2014 | Austrell | H04L 65/1073 370/331 |
| 2018/0007612 A1* | 1/2018 | Jahangir | H04W 8/005 |
| 2021/0037586 A1* | 2/2021 | Foti | H04L 65/1016 |
| 2021/0266349 A1* | 8/2021 | Foti | H04L 65/1073 |

* cited by examiner

SELF-HEALING AND RESILIENT IP MULTIMEDIA SUBSYSTEM CORE

TECHNICAL FIELD

Embodiments discussed herein generally relate to enhanced IP multimedia subsystem (IMS).

BACKGROUND

Serving-Call Session Control Function (S-CSCF) is a primary node in the IP multimedia subsystem (IMS) responsible for session control. When a subscriber (e.g., a user of a mobile network service using a user equipment (UE)) is trying to access the mobile network service, a S-CSCF may be allocated to register the subscriber in a session. During this registration process with the IMS, the S-CSCF facilitates the routing of session initialization protocol (SIP) messages. During the period where the registration is established, the S-CSCF ensures the registration is maintained.

As part of this process, the S-CSCF maintains a profile information and registration session establishment information of the UE. If an exception or outage occurred in S-CSCF, the session would be lost. Even after the S-CSCF recovers, the S-CSCF may not be able to restore the UE profile and the registration session information. The UE may not be able to initiate or receive any subsequent SIP messages (e.g., phone calls or messages) in this situation. The UE may then need to reestablish a new registration.

This existing approach involves various shortcomings, such as S-CSCF is unable to respond after calls and message failures; calls could not be completed by selecting another S-CSCF in the IMS network and HSS may not allow another S-CSCF to handle the session re-establishment (Re-Reg) of call and messages.

Therefore, improvements to overcome such shortcomings are needed through technical means.

SUMMARY

Aspects of the invention may enable a second S-CSCF to be available for registration when the first S-CSCF becomes unavailable. In another embodiment, an interrogating-Call Session Control Function (I-SCSF) may take over management of assigning a second S-CSCF when the first S-CSCF becomes unavailable or experiences a connection issue. In addition, the second S-CSCF may be activated with the restoration data feature turned off or deactivated.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

In one aspect, embodiments of the invention may include a system having enhanced processing of S-CSCF where:

as a result of disabling of the restoration data function by S-CSCF and the lack of storage of such restoration data by HSS, the HSS may allow downloading of a profile from a different S-CSCF from the one that initializes the registration;

the HSS may enable updating of a new S-CSCF; and a re-assignment pending flag in the HSS waiting for the new S-CSCF to be connected.

Furthermore, embodiments of the invention enable enhanced Interrogating-Call Session Control Function (I-CSCF) development by having the restoration function disabled and allowing a selection of another S-CSCF upon Timeout (RE-REG, mobile originating (MO) or mobile terminating (MT) INVITE). Moreover, another embodiments of the invention enable INVITE from a Proxy-Call Session Control Function (P-CSCF) with a "route-advance" tag.

Figure 1A:
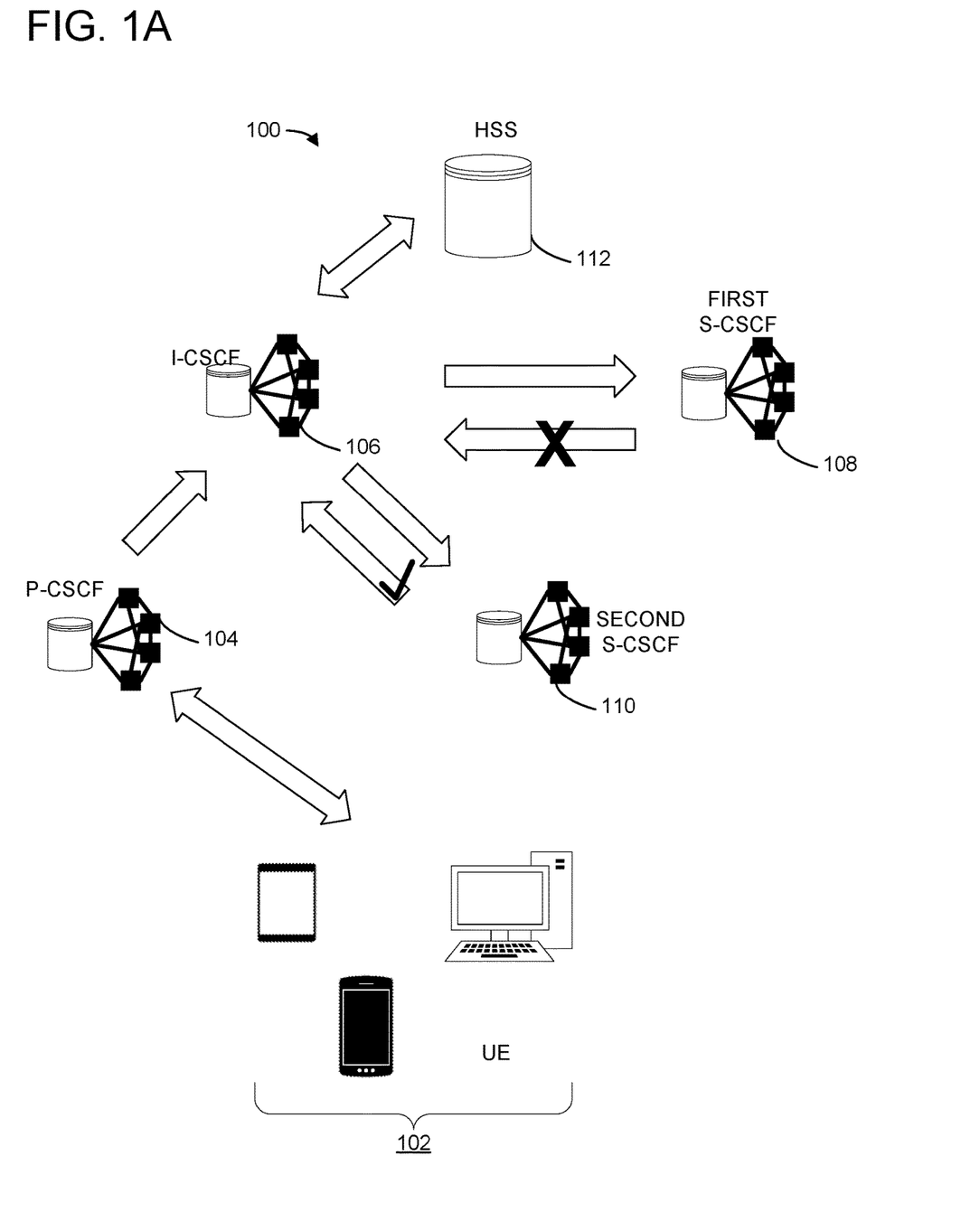
FIG. 1A is a diagram illustrating an overall system of Call Session Control Function implementation according to one embodiment.
Figure 1B:
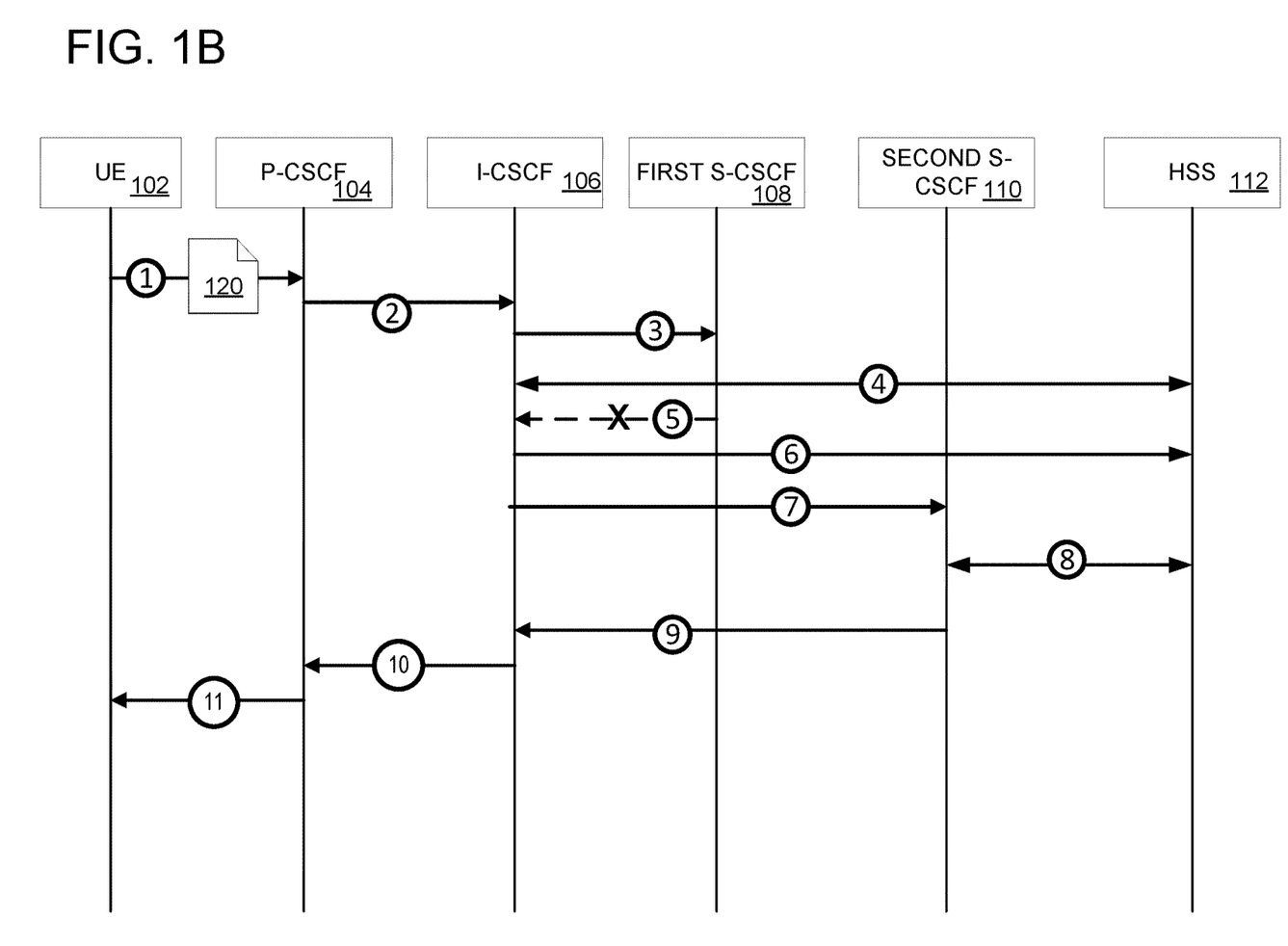
FIG. 1B is a diagram illustrating an exemplary process flow of the system of Call Session Control Function implementation according to one embodiment.

Referring now to FIGS. 1A to 1B, diagrams illustrate an overall system 100 of Call Session Control Function implementation according to one embodiment. For example, the system 100 may include a user equipment (UE) 102, such as a smartphone, a tablet, a laptop, or other devices having wireless connectivity to a mobile network supported by the system 100. In another embodiment, the UE 102 may be an IoT device—a device that is equipped with another internet connectivity device such that features of the device may be enhanced. In yet another example, the UE 102 may be a Web client on a device or on an Internet browser.

The system 100 may also include a Proxy-Call Session Control Function (P-CSCF) 104, an Interrogating-Call Session Control Function (I-CSCF) 106, a first Serving-Call Session Control Function (S-CSCF) 108, a second Serving-Call Session Control Function (S-CSCF) 110 and a Home Subscriber Server (HSS) 112. In another embodiment, the system may include other computer systems, hardware, or equipment to service the UE 102. For example, there may be additional computer servers and other dedicated wireless/cellular network equipment, not shown, that are included in the system 100. Other elements may be included without departing from the spirit and scope of the embodiments. For example, a cluster of servers or a distributed set of servers may be deployed to execute the P-CSCF 104, the I-CSCF 106, the first S-CSCF 108, and the second S-CSCF 110 across geographic areas. In another example, the HSS 112 may include a database or a data store storing the data or profile until the lifetime of registration and may only clear when the first S-CSCF 108 sends a SAR Deregistration message to the HSS 112. In another example, the HSS 112 may be a passive storage database device and may respond to instructions from the I-CSCF 106, the first S-CSCF 108, or the second S-CSCF 110. In one embodiment, the HSS 112 may communicate with the CSCFs and the network to provide subscriber profile and authentication information. The HSS 112 may further store information about subscribers to help in the authorization, details of devices, as well as the user's location and service information.

In yet another example, the HSS 112 may update the second S-CSCF 110 when the I-CSCF 106 selects the second S-CSCF 110 based on a Route-Advance feature tag or another similar indication and the second S-CSCF 110 sends Diameter Multimedia-Auth-Request (MAR) or Server-Assignment-Request (SAR) command, (e.g., at 8 in FIG. 1B below).

Referring now to FIG. 1B, another diagram further illustrates data and process flow between the elements shown in FIG. 1A. For the sake of simplicity and not as a limitation, the flow may start from the UE 102 where the UE 102 may first initiate a request 120 at 1 to register a session with the system 100. As part of the process, the P-CSCF 104 may be the first unit or element of the system 100 to receive such request. The P-CSCF 104 may next forward at 2 the request 120 to the I-CSCF 106 to register the UE 102. The I-CSCF 106 may proceed to invite the first S-CSCF 108 at 3 to register the UE 102. In that process, the I-CSCF 106 may reach out to the HSS 112 to retrieve the first S-CSCF 108 that is serving the user, and the I-CSCF 106 may then proceed to invite the first S-CSCF at 4 to register the UE 102."

However, as illustrated in FIGS. 1A and 1B, the first S-CSCF 108 may not be available due to errors, loss of connections to the network, internal failures, etc. As such, either the first S-CSCF 108 would not respond to the invite at 5 after timeout or an SIP failure, the I-CSCF 106 may send a message to the HSS 112 at 6 to activate a re-assignment pending flag to be true. In one embodiment, the I-CSCF 106 may send instructions to the HSS 112 to be ready for a different connection other than the first S-CSCF 108. It is to be understood that under normal circumstances, due to security measures, the HSS 112 would not easily allow switching or changing of the S-CSCF. However, with the flag, the HSS 112 may be able to be ready for a different S-CSCF.

At 7, the I-CSCF 106 may invite the S-CSCF 110 as part of the re-registration for the UE 102. Upon receiving the invite, the second S-CSCF 110 may send a message or command at 8 to the HSS 112 to receive the profile information of the registration request from the UE 102. For example, as the re-assignment pending flag was turned to be true by the I-CSCF 106, the second S-CSCF 110 may request the profile information from the HSS 112 and the HSS 112 may answer authorizing the request. Thereafter, the second S-CSCF 110 may respond to the I-CSCF 106 to establish the registration at 9. The I-CSCF 106 may then respond at 10 to the P-CSCF 104 that the second S-CSCF 110 may be the entity that register the UE 102 after P-CSCF 104 responds back to the UE 102 at 11.

It is to be understood that the precondition of the flows 1 through 11 may be that the restoration feature is turned off or deactivated.

Figure 2A:
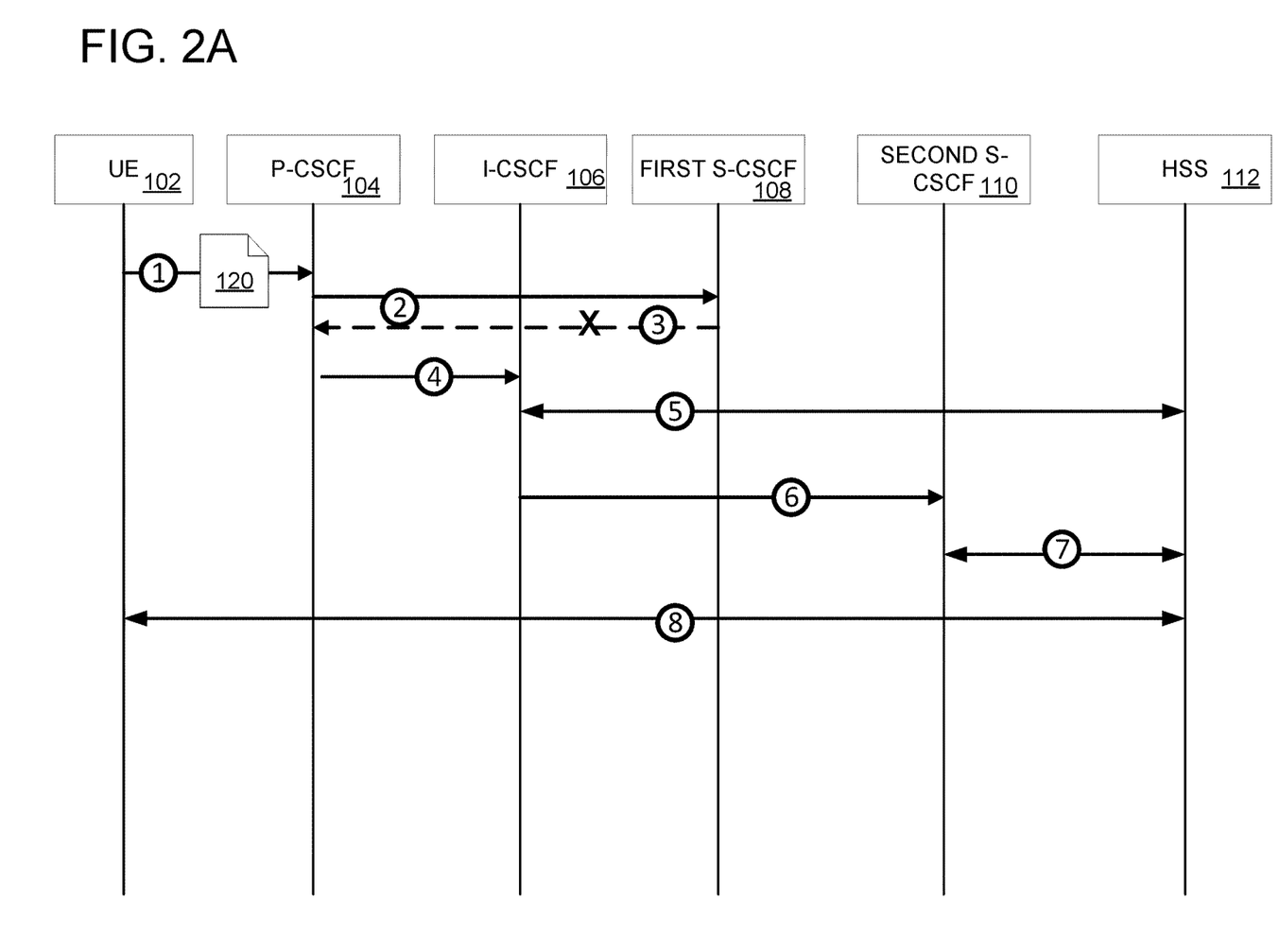
FIG. 2A is a diagram illustrating one embodiment of a system of Call Session Control Function according to one embodiment.

To further illustrate another aspects of the invention, the following examples are further discussed with respect to FIG. 2A.

Example 1: For the UE 202 to Establish a Session when the First S-CSCF or an Assigned S-CSCF (e.g., the First S-CSCF 108) is Unavailable 1) When P-CSCF 104 forwards the request, after receiving from the UE 102 at 1, to the first S-CSCF 108 with a re-REGISTER command at 2, a timer F (e.g., a SIP TimerF) may expire because the first S-CSCF 108 is unavailable or fails to respond at 3.
2) The P-CSCF 104 may forward REGISTER to the I-CSCF, including the route-advance indicator at 4.
3) The I-CSCF 106, upon detecting the route-advance indicator, may send at 5 a command such as Cx user-authorization-request (UAR) with User-Authorization-Type=REGISTRATION_AND_CAPABILITIES and no IMSRestorationInd AVP to the HSS 112. The HSS 112 may set the reassignment pending flag to True.
4) Upon receipt of a successful command response, such as Cx user-authorization-answer (UAA) from the HSS 112 at 6, the I-CSCF may select or assign a new S-CSCF, such as the second CSCF 110.
5) At 7, the second S-CSCF 110 may treat selection or assignment from the I-CSCF 106 as a new Initial REGISTER request, and may send a command such as Cx SAR to the HSS 112. The HSS 112 may then register the second S-CSCF 110 and subsequently from the S-CSCF 110 may report back to the chain through I-CSCF 106 via 8, to the P-CSCF 104 via 9 and to the UE 102 via 10.

In yet another embodiment, still referring to FIG. 2A, the following example may illustrate one particular circumstance:

Example 2: For MO INVITE, when the First S-CSCF is Down or Non-Responsive

1) The P-CSCF 104 may try to send INVITE to the first S-CSCF 108, but timer B may expire (flow 1 through 3);

2) The P-CSCF 104 may send INVITE to the I-CSCF 106 with an route-advance indicator at 4;
3) The I-CSCF 106 may send a command such as a Cx location-info-request (LIR) with User-Authorization-Type=REGISTRATION_AND_CAPABILITIES at 5. The HSS 112 may set the reassignment pending flag to true;
4) Upon receipt of Cx location-info-answer (LIA) from the HSS 112, the I-CSCF 106 may select a new S-CSCF and send the INVITE to the second S-CSCF 110 at 6.
5) The second S-CSCF 110 may treat this INVITE as Unregistered case;
6) The second S-CSCF may send a command such as a Cx SAR with Server-Assignment-Type=NO_ASSIGNMENT to the HSS 112 at 7;
7) The HSS 112 may return a Cx Server-Assignment-Answer (SAA) with the profile, and the second S-CSCF 110 may perform an initial filter condition (iFC) execution. In one embodiment, the iFC may be stored in the HSS 112 as part of the IMS Subscription Profile and are downloaded to the second S-CSCF 110 upon user registration. The second S-CSCF 110 may now be able to proceed with further call setup successfully at 8.
8) The second S-CSCF 110 may further send a command such as Cx SAR to clear the profile after the registration ends.

In one example, Example 2 may be enable restoration for RE-REG timing out to the mobile network for a specific IMEI/UUID. For example, the flow in Example 2 may allow the HSS 112 to set "reassignment pending flag" when LIR REG&CAP received without an IMS restoration. In yet another embodiment, the HSS 112 may already support allow command parameters such as SAR without MAR if Reassignment Pending flag is SET. The HSS 112 may clear "reassignment pending flag" and update the new S-CSCF after SAA.

Figure 2B:
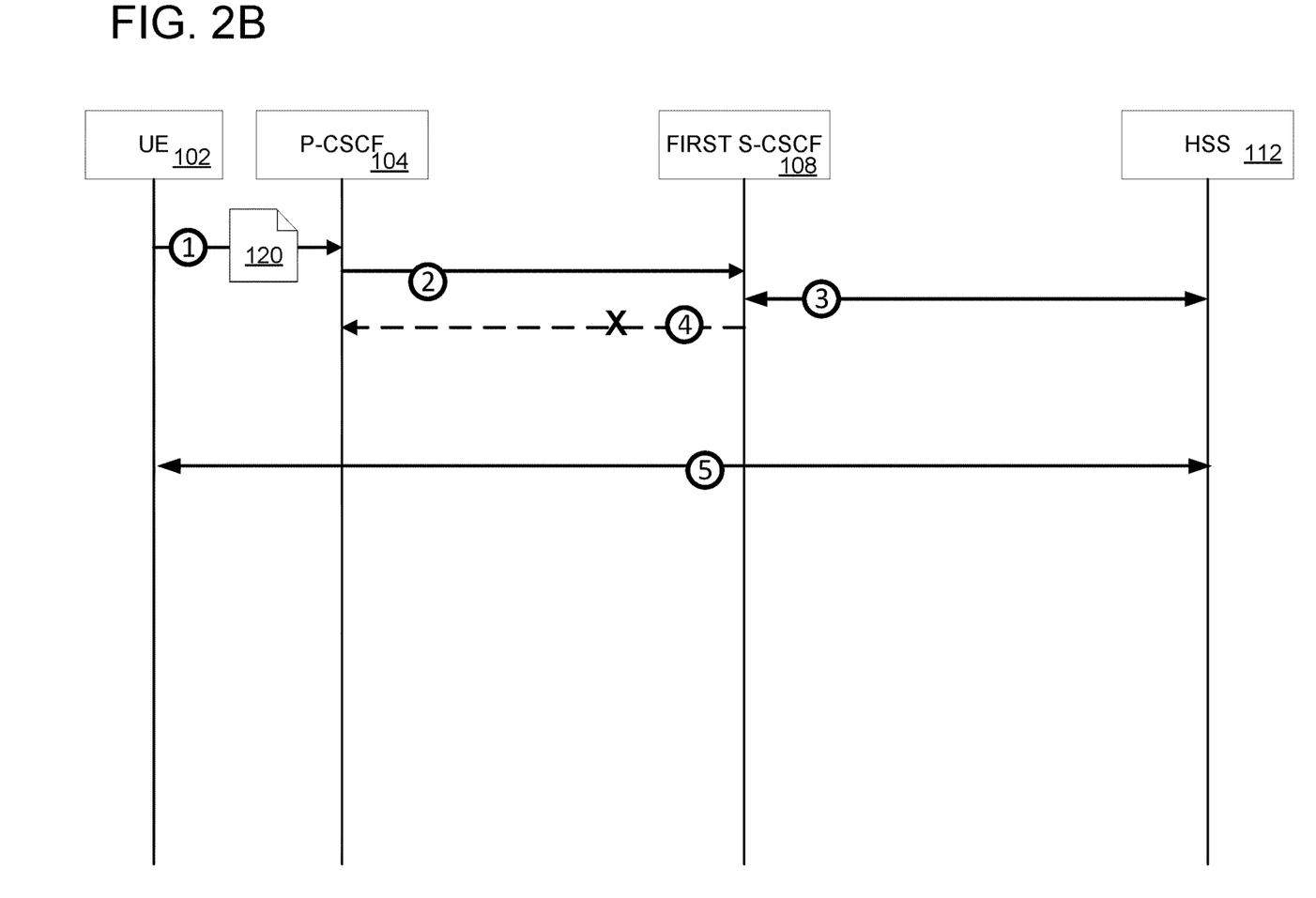
FIG. 2B is another diagram illustrating another embodiment of the system of Call Session Control Function according to one embodiment.

In yet a further example, FIG. 2B may further illustrate the following example:

Example 3: For MO INVITE, when Assigned
S-CSCF (e.g., the First S-CSCF 108) has Failed
and Recovered (Handled by Error Code)

(1) INVITE may be sent from the P-CSCF 104 to the first S-CSCF 108 (from flows 1 to 2) and, as long as information in local cache or a S-CSCF backup storage DB is available, the first S-CSCF 108 may be able to find the registration context when request is received from the P-CSCF 104 at 3.

However, at 4, if the first S-CSCF 108 could not locate the registration context for INVITE request, and (2) before sending 403 forbidden, the first S-CSCF may send a command such as the Cx SAR with Server-Assignment-Type=NO_ASSIGNMENT to the HSS 112 at 3.

If SAA with 2001 (e.g., "DIAMETER_SUCCESS") is received (the HSS 112 may see no change in the S-CSCF name and allow), the first S-CSCF 108 may execute iFC and proceed the call.

If SAA fails with 5012 (e.g., "DIAMETER_UNABLE_TO_COMPLY") (the HSS 112 may see a change in the S-CSCF name && re-assignment pending flag is false as the I-CSCF 106 did not request for new capabilities), S-CSCF to send 403 Forbidden with Reason Code "User Registration Not Found".

3) The HSS 112 may return a Cx SAR with the profile, and the first S-CSCF 108 may perform the iFC execution. The call may succeed. The HSS 112 may allow to download user profile if same registered SCSCF request SAR with NO_ASSIGNMENT. The first S-CSCF 105 may now be able to proceed with further call setup successfully at 5.

Figure 2C:
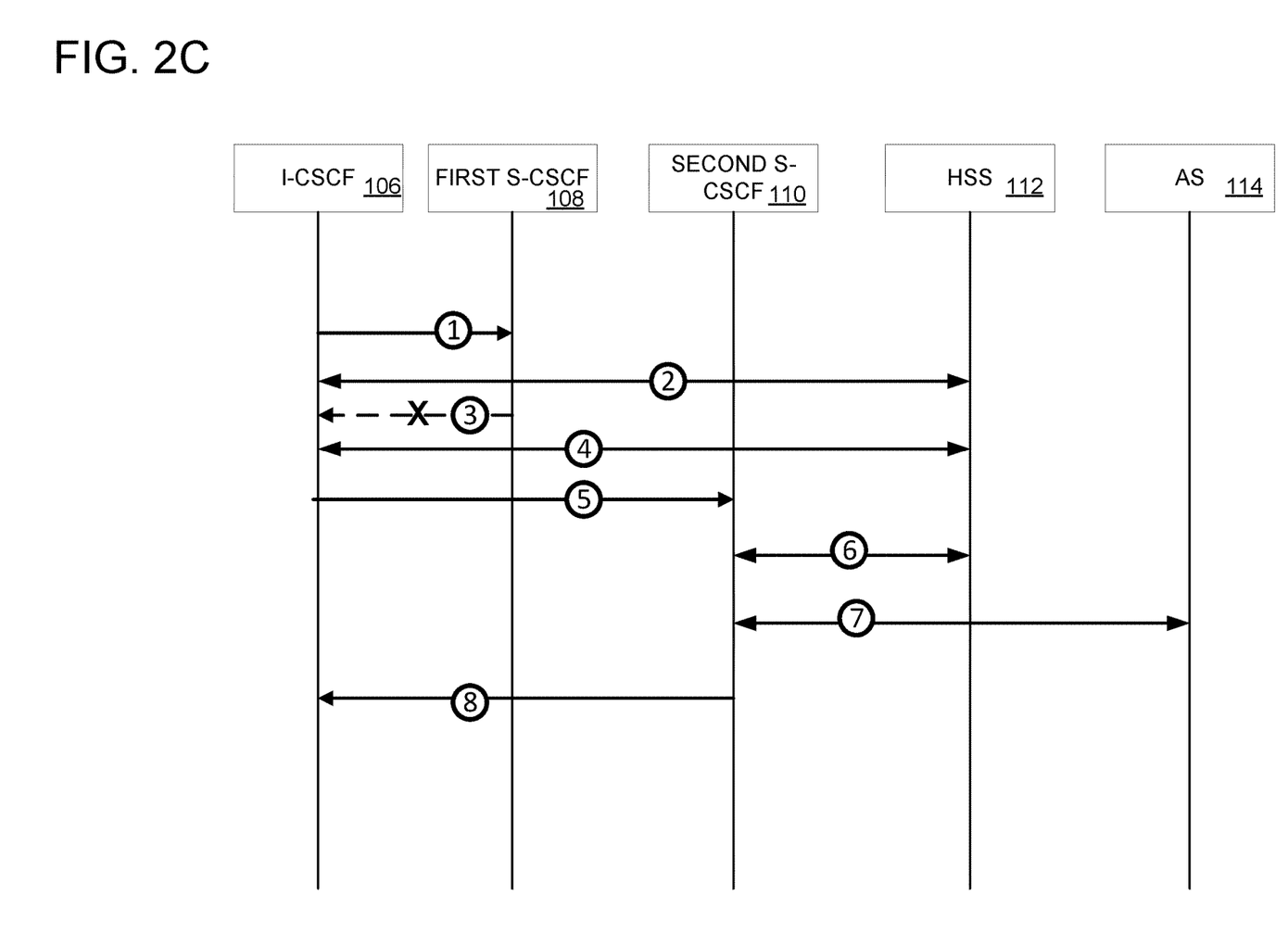
FIG. 2C is yet another diagram illustrating a further embodiment of the system of Call Session Control Function according to one embodiment.

In yet a further embodiment, FIG. 2C may be used to further illustrate the following example:

Example 4: For MT INVITE, when the First
S-CSCF 108 is Down

1) The I-CSCF 106 may first try to send an INVITE to the first S-CSCF 108 at 1 (wherein the address returned from 1st Cx LIR at 2), timer B may expire at 3.
2) The I-CSCF 106 then may, at 4, send a command Cx Location_Info_Request (LIR) with User-Authorization-Type=REGISTRATION_AND_CAPABILITIES. The HSS 112 may set the reassignment pending flag to true.
3) Upon receipt of a command such as Cx UAA from the HSS 112, the I-CSCF 106 may select a new S-CSCF (e.g., the second S-CSCF 110) at 5;
4) The second S-CSCF 110 may handle this as normal, and may send a command such as Cx SAR without any restoration data and Server-Assignment-Type=–UNREGISTERED_USER at 6.
5) The HSS 112 may return a command such as Cx SAA with user profile at 6 and
6) The second S-CSCF 110 may perform iFC execution and may select at 7 an application server (AS) (e.g., telephony application server) 114 based on domain name system (DNS).
7) If the AS 114 does not have the user profile cashed (i.e. the TAS 114 chosen is not the one that the user was previously mapped to):
 a. The AS 114 may consider this INVITE request as unregister and may trigger CS breakout.
8) If the AS 114 has the user profile cashed (i.e. the TAS 114 chosen is the one that the user was previously mapped to):
 a. The AS 114 may attempt PS delivery, sending the INVITE back to the same S-CSCF (e.g., the second S-CSCF 110) from which it was received. This S-CSCF may not have any contact bindings registered, so it returns a 480 response (per 24.229) (e.g., "temporarily unavailable"). This may trigger CS retry on the TAS 114.

Moreover, FIG. 2C may further be used to illustrate the following example:

Example 5: For MT INVITE, when Assigned
S-CSCF has Failed and Recovered

1) INVITE from the I-CSCF 108 to the first S-CSCF 110 (address returned from 1st Cx LIR) at 1.
2) Call may then be handled the same as steps 4-8 above of Example 4.

For above Timeout Advance Feature (Non-Standard IMS-Restoration), the trigger is Timer B Expiry.

In one embodiment, as a result of the restoration function being disabled or deactivated, aspects of the invention may further configure specification trigger behaviors in response to trigger conditions from the S-CSCF. For example, specific behavior may be defined for error codes such as 504 or 500.

While various parts of the disclosure refer to S-CSCF as the unit or control that interacts with the HSS, it is to be understood that I-CSCF or P-CSCF may be used as well without departing from the spirit and scope of the embodiments. In other words, the HSS may interact with S-CSCF, I-CSCF, or P-CSCF in selecting the second CSCF to establish a new session.

In yet a further embodiment, the local cache may store the profile for the first S-CSCF 108 so that when the first S-CSCF 108 recovers, the first S-CSCF 108 may be able to retrieve from the cache of the local cache.

Figure 3:
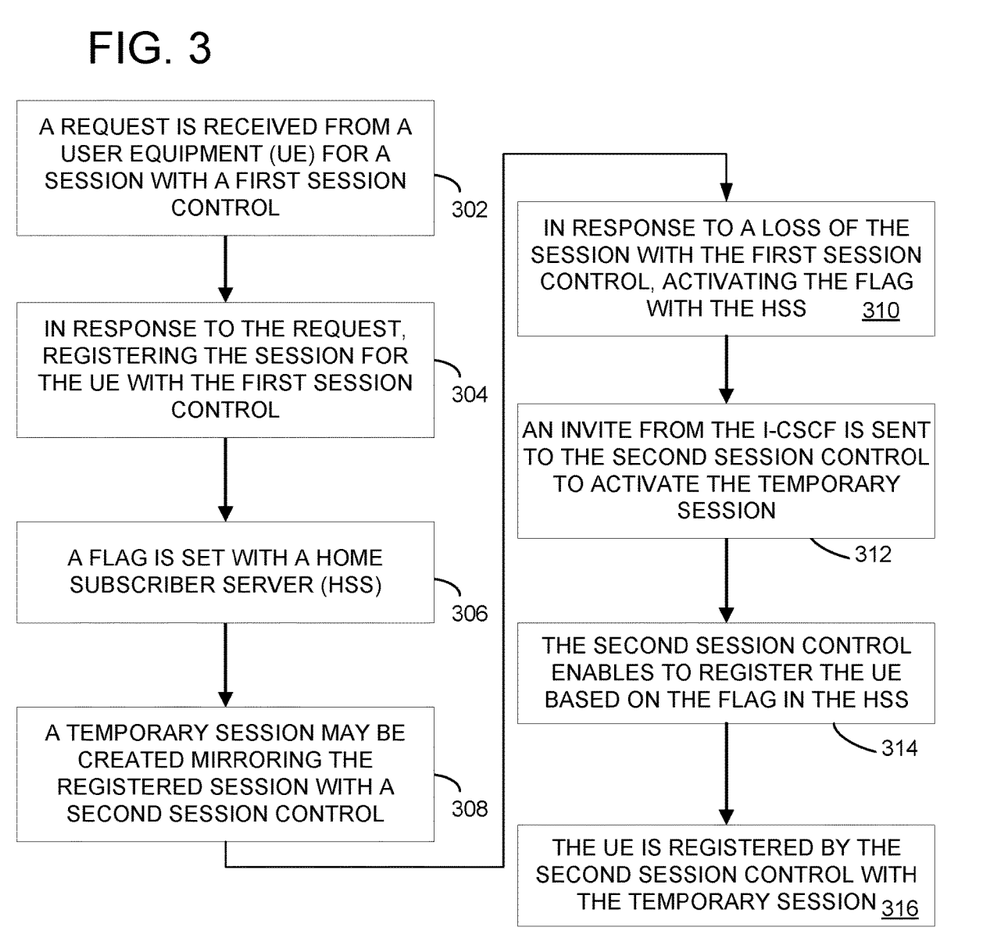
FIG. 3 is a flow chart illustrating a method for an enhanced Call Session Control Function according to one embodiment.

FIG. 3 is a flow chart illustrating a method for a resilient IMS core according to one embodiment. At 302, a request is received from a user equipment (UE) for a session with a first session control. In response to the request, registering the session for the UE with the first session control, such as the first S-CSCF 108 at 304. A flag is set with a Home Subscriber Server (HSS) at 306. In one embodiment, the flag may be a re-assignment pending flag. A temporary session may be created mirroring the registered session with a second session control at 308. For example, as a response to an expiry of a timer.

In one embodiment, in response to a loss or an unavailability of the session with the first session control, activating the flag with the HSS at 310. An invite from an I-CSCF is sent to the second session control to activate the temporary session at 312. The second session control enables to register the UE 102 based on the flag in the HSS 122 at 314. The UE is registered with the second session control with the temporary session at 316.

Figure 4:
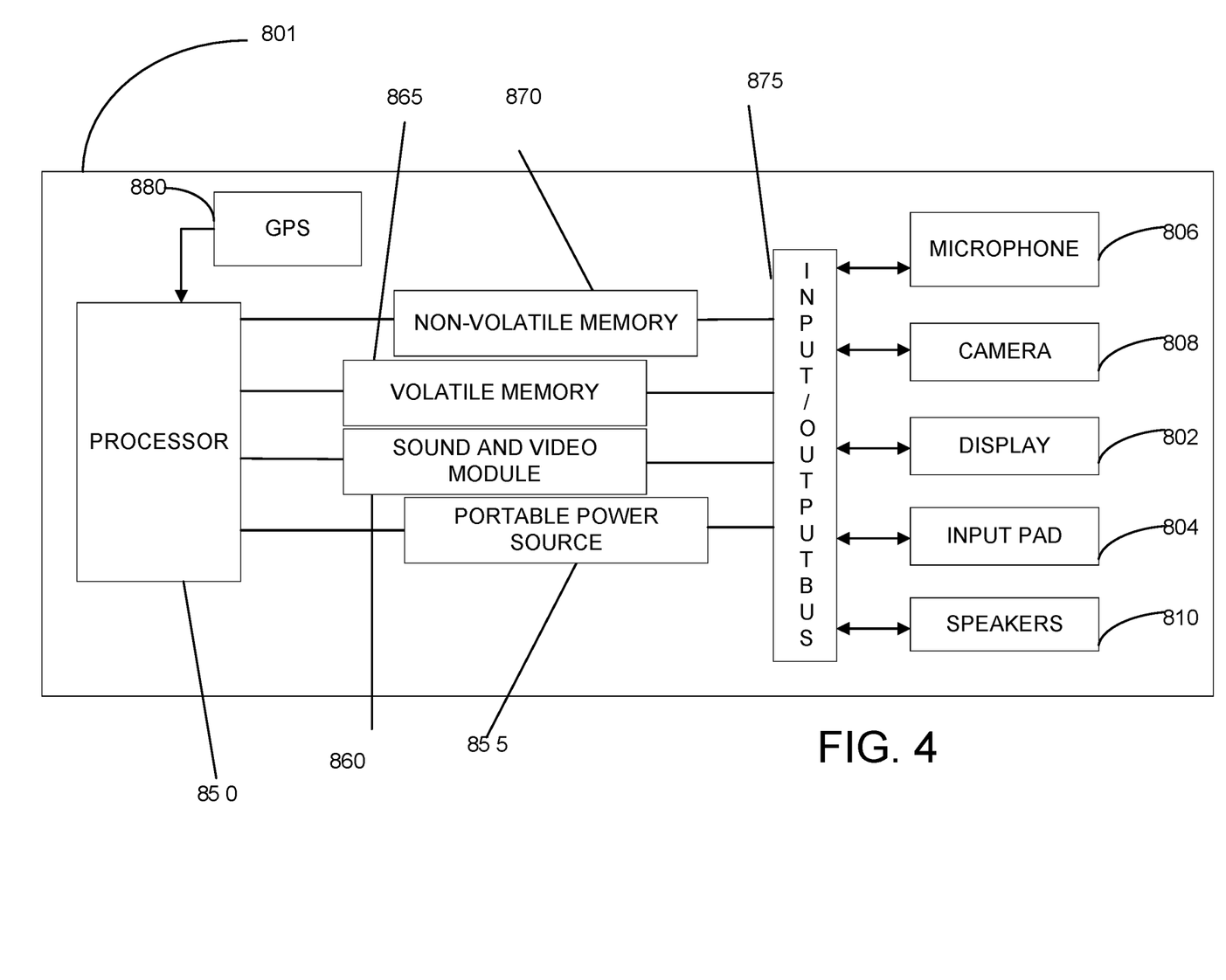
FIG. 4 is a diagram illustrating a portable computing device according to one embodiment.
Figure 5:
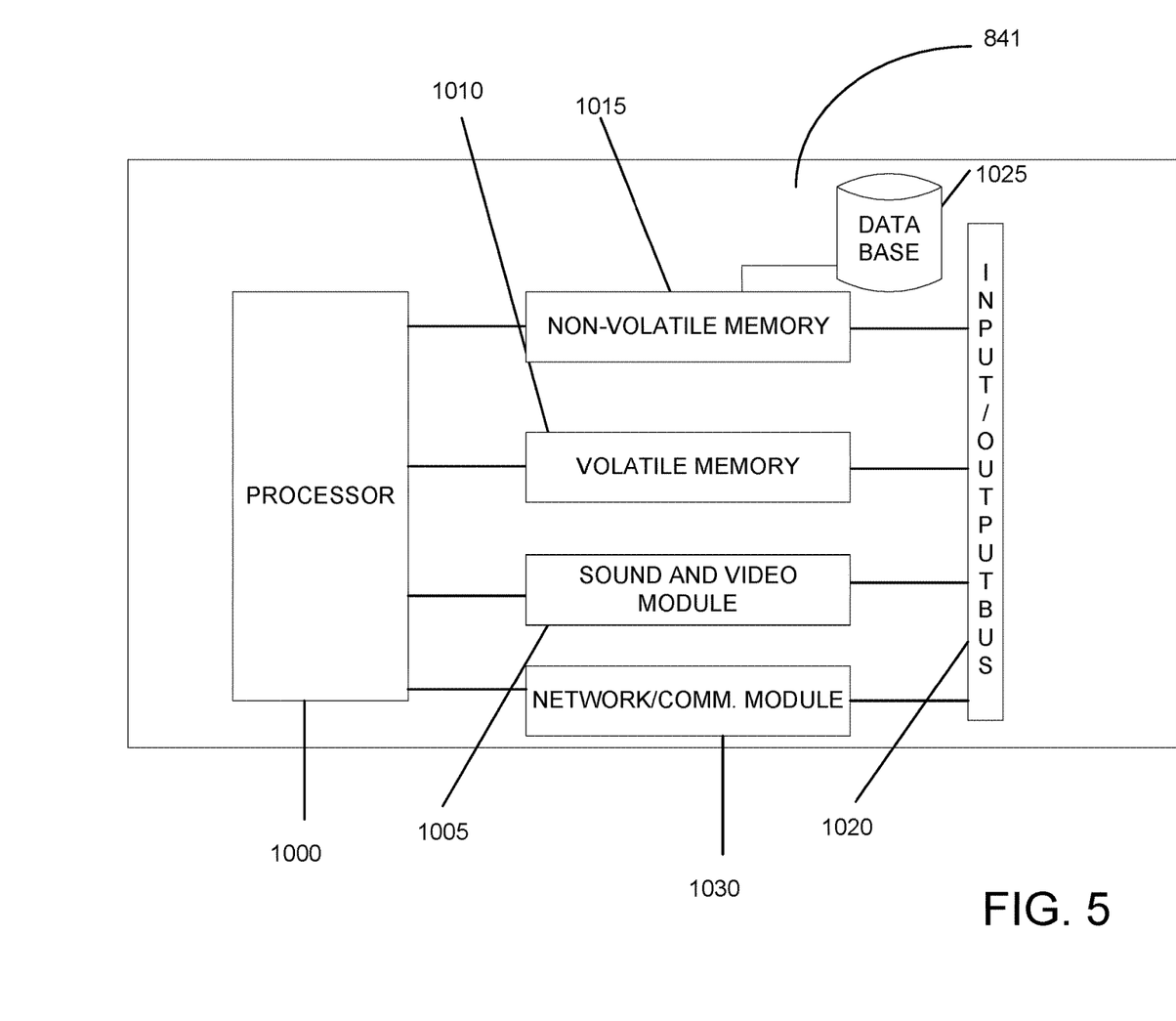
FIG. 5 is a diagram illustrating a computing device according to one embodiment.

FIG. 4 may be a high level illustration of a portable computing device 801 communicating with a remote computing device 841 in FIG. 5 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network such as cellular service, through the Internet, through a private network, through BLUETOOTH, etc., via a network or communication module 880.

FIG. 4 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. The network or communication module 880 may have GPS, BLUETOOTH, NFC, cellular or other communication capabilities. In one embodiment, some or all of the network or communication capabilities may be separate circuits or may be part of the processor 850. There also may be an input/output bus 875 that shuttles data to and from the various user input devices such as the microphone 806, the camera 808 and other inputs, such as the input pad 804, the display 802, and the speakers 810, etc. It also may control communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 5. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 may also connect to similar devices of the microphone 806, the camera 808, the inputs such as the input pad 804, the display 802, and the speakers 810, or other peripheral devices, etc. The input/output bus 1020 also may interface with a network or communication module 1030 to control communicating with other devices or computer networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein (e.g., 801 or 841) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges of relying on existing practices of content filtering—a hardware solution. Rather, with the flexibility and decoupling of the user plane and the control plane, aspects of the invention may more efficiently accomplish content filtering without being tied to hardware-dependent.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
   receiving a request from a user equipment (UE) for a session with a first serving call session control function (S-CSCF);
   in response to the request, registering the session for the UE with the first S-CSCF;

in response to the request, setting a re-assignment pending flag with a Home Subscriber Server (HSS);
in response to the request, creating a temporary session mirroring the registered session with a second S-CSCF before a loss of the session;
in response to the loss of the session with the first S-CSCF, activating the re-assignment pending flag with the HSS;
sending an invite from an interrogating call session control function (I-CSCF) to the second S-CSCF to activate the temporary session; and
registering the UE by the second S-CSCF with the temporary session, wherein the UE continues the temporary session with the second S-CSCF.

2. The computer-implemented method of claim 1, wherein the loss of the session comprises a timeout of the first S-CSCF.

3. The computer-implemented method of claim 1, wherein the first S-CSCF further deactivates a restoration data parameter after registering the session with the UE.

4. The computer-implemented method of claim 3, further comprising terminating the session by the first S-CSCF once the first S-CSCF recovers from the loss.

5. The computer-implemented method of claim 1, wherein receiving the request comprises receiving the request from the UE at a proxy call session control function (P-CSCF), wherein the P-CSCF is configured to send the request to the I-CSCF.

6. A non-transitory computer storage medium having a plurality of programming instructions stored thereon that, when executed by one or more processors of one or more computing devices, cause the one or more computing devices to perform operations comprising:
receiving a request from a user equipment (UE) for a session with a first serving control session control function (S-CSCF);
in response to the request, registering the session for the UE with the first S-CSCF;
in response to the request, setting a re-assignment pending flag with a Home Subscriber Server (HSS);
in response to the request, creating a temporary session mirroring the registered session with a second S-CSCF before a loss of the session;
in response to the loss of the session with the first S-CSCF, activating from the first S-CSCF the re-assignment pending flag with the HSS;
sending an invite from an interrogating call session control function (I-CSCF) to the second S-CSCF to activate the temporary session; and
registering the UE by the second S-CSCF with the temporary session, wherein the UE continues the temporary session with the second S-CSCF.

7. The non-transitory computer storage medium of claim 6, wherein the loss of the session comprises a timeout of the first S-CSCF.

8. The non-transitory computer storage medium of claim 6, wherein the first S-CSCF is configured to deactivate a restoration data parameter before or after registering the session with the UE.

9. The non-transitory computer storage medium of claim 8, wherein the operations further comprise terminating the session by the first S-CSCF once the first S-CSCF recovers from the loss.

10. The non-transitory computer storage medium of claim 6, wherein the session comprises a registration session.

11. A computer-implemented system comprising:
a user equipment (UE) for using services of a communications network;
a database accessible by one or more processors for storing session information, the database comprises a Home Subscriber Server (HSS);
wherein the one or more processors are configured to execute computer-executable instructions comprising:
receiving a request from the user equipment (UE) for a session with a first serving call session control function (S-CSCF);
in response to the request, registering the session for the UE with the first S-CSCF;
in response to the request, setting a re-assignment pending flag with the database;
in response to the request, creating a temporary session mirroring the registered session with a second S-CSCF before a loss of the session;
in response to the loss of the session with the first S-CSCF control, activating from the first S-CSCF the re-assignment pending flag with the database;
sending an invite to the second S-CSCF to activate the temporary session; and
registering the UE by the second S-CSCF with the temporary session, wherein the UE continues the temporary session with the second S-CSCF.

12. The computer-implemented system of claim 11, wherein the one or more processors are configured to deactivate a restoration data parameter for the first S-CSCF.

13. The computer-implemented system of claim 12, wherein the one or more processors are further configured to terminate the session with the first S-CSCF once the first S-CSCF recovers from the loss.

14. The computer-implemented system of claim 11, wherein the one or more processors are configured to deactivate a restoration data parameter for the second S-CSCF session control.

15. The computer-implemented system of claim 11, wherein the loss of the session comprises a timeout of the first S-CSCF.

16. The computer-implemented system of claim 11, wherein the one or more processors are configured to configure a default setting of restoring data to be off.

17. The computer-implemented system of claim 11, wherein the session comprises a registration session.

18. The computer-implemented system of claim 11, wherein the one or more processors are configured to receive the request from the UE via a proxy call session control function (P-CSCF), wherein the one or more processors are further configured to send the request from the P-CSCF to an interrogating call session control function (I-CSCF).

* * * * *